United States Patent
Maki (10) Patent No.: US 8,040,563 B2
(45) Date of Patent: Oct. 18, 2011

(54) PRINTING METHOD, PRINTING APPARATUS, CORRESPONDING TABLE CREATING METHOD AND PROGRAMS

(75) Inventor: Yoichiro Maki, Shiojir (JP)

(73) Assignee: Seiko Epson Corporation, Tokyo (JP)

( * ) Notice: Subject to any disclaimer, the term of this patent is extended or adjusted under 35 U.S.C. 154(b) by 344 days.

(21) Appl. No.: 12/361,247

(22) Filed: Jan. 28, 2009

(65) Prior Publication Data

US 2009/0225379 A1 Sep. 10, 2009

(30) Foreign Application Priority Data

Jan. 28, 2008 (JP) ................................. 2008-015883

(51) Int. Cl.
*H04N 1/60* (2006.01)

(52) U.S. Cl. .......... 358/1.9; 358/523; 358/524; 358/520

(58) Field of Classification Search ................... 358/1.9, 358/2.1, 2.99, 518, 520, 523, 524, 538; 382/162, 382/164, 165, 176, 190, 229, 306
See application file for complete search history.

(56) References Cited

U.S. PATENT DOCUMENTS

| 5,768,403 A * | 6/1998 | Suzuki et al. ................... 358/2.1 |
| 7,142,716 B2 * | 11/2006 | Katsuyama et al. .......... 382/190 |
| 2002/0154817 A1 * | 10/2002 | Katsuyama et al. .......... 382/190 |
| 2006/0215909 A1 * | 9/2006 | Itonori et al. ................. 382/176 |
| 2007/0296988 A1 * | 12/2007 | Tsuji .............................. 358/1.9 |
| 2009/0123071 A1 * | 5/2009 | Iwasaki ......................... 382/176 |

FOREIGN PATENT DOCUMENTS

JP 2006-197549 7/2006

* cited by examiner

*Primary Examiner* — Kimberly A Williams (74) *Attorney, Agent, or Firm* — Nutter McClennen & Fish LLP (57) ABSTRACT

A method for printing an image includes: generating a third table in which a second table, indicating a relationship between one of a plurality of brightness values and an amount of ink of an achromatic color for representing the one of the brightness values, is embedded in the first table, indicating a relationship between a color defined by each of the first lattice points and amounts of the ink of the achromatic color and ink of chromatic colors; converting first RGB components of the image data corresponding to a character area into the RGB components defined by the some of the lattice points based on brightness values of the RGB components of the image data, thereby generating modified image data; converting the RGB components of the modified image data into amounts of the ink o; and printing the image in accordance with the converted amounts.

9 Claims, 10 Drawing Sheets

$$\Downarrow$$

$$(R,G,B) = (255, 255, \underbrace{\frac{0.3r + 0.6g + 0.1b}{4}}_{\text{GRAY SCALE}})$$

PRINTING METHOD, PRINTING APPARATUS, CORRESPONDING TABLE CREATING METHOD AND PROGRAMS

BACKGROUND

1. Field of the Invention

The present invention relates to a technique capable of attaining a high-quality printing of characters by using a printing apparatus.

2. Description of the Related Art

At present, high-quality copy images can be easily obtained by using a color copier. Such a color copier is substantially constituted with a scanner unit for reading an image and a printing unit for printing a copy image. On outputting the copy image, light is first shed to a manuscript image on the scanner unit to read light reflected from the manuscript image, thereby creating image data. Then, the thus read image data is converted to data on ink amount of CYMK respective colors (color conversion processing) and printing is executed on the basis of the thus obtained data on ink amounts by the printing unit to output a high-quality copy image.

On the other hand, color copiers have a tendency that characters on an image will inevitably result in a reduction in quality. Specifically, where characters are read by using a scanner unit, even a black-color character reflects light to some extent and develops into a character having a tinge of gray due to the thus read image data. Then, when the gray-tinged character is converted to data on ink amounts, it is converted to data on ink amounts in which CMY respective color inks are used in addition to K (black) ink for expressing gray color. Thus, the inks are used in an increased amount in printing and ooze out. Due to the above reason and others, characters undergo reduction in quality such as blurred outlines of the characters. Thus, there has been proposed a technique in which a character-specific color conversion table which is used for conversion to data on exclusive amounts of K ink is provided in addition to an ordinary color conversion table, and the character-specific color conversion table is used at a part of characters to effect conversion to the data on exclusive amounts of K ink, thereby avoiding characters blurred with inks or others to attain a high-quality printing of characters, as disclosed in JP-A-2006-197549.

However, the above-proposed a technique has a problem that a high-quality copy image is not easily obtained. Specifically, it is necessary to execute color conversion processing, while the ordinary color conversion table is switched to the character-specific color conversion table or vice versa, thereby the color conversion processing is inevitably complicated. For this reason, such a problem is posed that a high-quality copy image is not output easily.

SUMMARY

According to an aspect of the invention, there is provided a method for printing an image by using ink of at least one achromatic color and at least three chromatic colors based on RGB image data obtained from a printed image, the method including: setting a plurality of first lattice points in an RGB color solid defined by RGB components of the RGB image data; storing a first table indicating a relationship between a color defined by each of the first lattice points and amounts of the ink of the achromatic color and the ink of the chromatic colors; storing a second table indicating a relationship between one of a plurality of brightness values and an amount of the ink of achromatic color for representing the one of the brightness values; storing information indicating a relationship between the brightness values and some of the first lattice points located at a ridge area including a ridge line of the RGB color solid at which two of the RGB components take either maximum values or minimum values thereof; generating a third table in which the second table is embedded in the first table based on the information; extracting a character area in which a character is printed from the printed image; converting first RGB components of the image data corresponding to the extracted character area into the RGB components defined by the some of the lattice points based on brightness values of the RGB components of the image data, thereby generating modified image data; converting the RGB components of the modified image data into amounts of the ink of a chromatic color and the ink of chromatic colors based on the third table; and printing the image in accordance with the converted amounts of the ink of achromatic color and the ink of chromatic colors.

According to an another aspects of the invention, there is provided a printing apparatus for printing an image by using ink of at least one achromatic color and at least three chromatic colors based on RGB image data obtained from a printed image, the printing apparatus including: a first storage, configured to set a plurality of first lattice points in an RGB color solid defined by RGB components of the RGB image data, and configured to store a first table indicating a relationship between a color defined by each of the first lattice points and amounts of the ink of the achromatic color and the ink of the chromatic colors; a second storage, configured to store a second table indicating a relationship between one of a plurality of brightness values and an amount of the ink of achromatic color for representing the one of the brightness values; a third storage, configured to store information indicating a relationship between the brightness values and some of the first lattice points located at a ridge area including a ridge line of the RGB color solid at which two of the RGB components take either maximum values or minimum values thereof; a generator, configured to generate a third table in which the second table is embedded in the first table based on the information; a extractor, configured to extract a character area in which a character is printed from the printed image; a first converter, configured to convert first RGB components of the image data corresponding to the extracted character area into the RGB components defined by the some of the lattice points based on brightness values of the RGB components of the image data, thereby generating modified image data; a second converter, configured to converting the RGB components of the modified image data into amounts of the ink of achromatic color and the ink of chromatic colors based on the third table; and a printer, configured to print the image in accordance with the converted amounts of the ink of achromatic color and the ink of chromatic colors.

In the printing method and the printing apparatus of the present invention, there is stored the first table in which a plurality of lattice points provided in a RGB color solid are allowed to correspond to used amounts of inks. There is also stored the second table in which brightness values are allowed to correspond to used amounts of achromatic color inks. In this instance, any brightness value will be acceptable as long as it is a value corresponding to the brightness of an image, including, for example, a V gradation value in a HSV color specification system, a Y gradation value in a YCC color specification system, or a total value and a mean value of gradation values of RGB respective components. Further, there is stored the corresponding relationship in which brightness values are allowed to correspond to lattice points (ridge line lattice points) in a predetermined area including a ridge line of the first table. In this instance as the predetermined area which includes a ridge line, any space will be acceptable as long as it is adjacent to a ridge line which includes a ridge line. For example, the space may be a space enclosed by a lattice point adjacent to a ridge line and the ridge line, or may be an area including up to a lattice point next to the lattice point adjacent to the ridge line. Used amounts of inks which are allowed to correspond to ridge line lattice points by the first table are replaced by used amounts of inks which are allowed to correspond to brightness values by the second table on the basis of a corresponding relationship between the brightness value and ridge line lattice points, thereby created is third table (synthesis table) in which the second table is embedded in a part of the first table. Further, image data on a manuscript image is read, by which image data on a character area is converted so as to give RGB respective components at an area of ridge lines in a synthesis table (an area in which the second table is embedded). Thereby, the thus read image data is converted to corrected image data. Where the image data on the character area is converted to the RGB respective components in a ridge line area, the image data on the character area is converted to brightness values, which may be converted to the RGB respective components according to a previously stored corresponding relationship. The thus obtained corrected image data is converted to used amounts of inks according to the previously created synthesis table, and thereafter, an image is printed according to the thus obtained used amounts of inks.

Thereby, where a character area is converted to an ink amount, the RGB respective components are changed, by which a reference is made to a ridge line area of the synthesis table in which the second table is embedded, thereby the character area is converted to used amounts of inks exclusively made up of achromatic color inks according to the second table. Then, the character area is printed by using only the achromatic color inks, thus making it possible to obtain a high-quality printing without a reduction in image quality such as blurred outlines of characters which are found in a case where chromatic color inks are used in printing. On the other hand, regarding a part of an image other than characters, as with a case where the first table is referred, achromatic color inks and chromatic color inks can be used in printing, thus making it possible to print a high-quality image. Consequently, both the part other than characters and that of characters can be printed in high quality.

Further, where image data is converted to used amounts of inks, an exclusive reference to the synthesis table is sufficient, and there is no need for referring to two tables, that is, the first table and the second table. Therefore, processing that the first table is switched to the second table or vice versa is not required, thereby the processing is not complicated on conversion of the image data to the used amounts of inks. As a result, it is possible to print a high-quality image conveniently.

In addition, even if a character area is incorrectly recognized, an appropriate image can be printed. Specifically, where a part which is not a character area of image data is incorrectly recognized as the character area, brightness values are allowed to correspond to used amounts of achromatic color inks in the second table, by which a reference of the thus incorrectly recognized part to the second table makes it possible to obtain the used amounts of achromatic color inks corresponding to the brightness values of the incorrectly recognized part. Therefore, at the incorrectly recognized part, chromatic color inks and achromatic color inks should be used to print but actually only the achromatic color inks are used in printing, and an image is printed at correct lightness. Thereby, even where incorrect recognition takes place in recognizing characters, the image is not unnatural, and can be printed appropriately. Further, the above fact eliminates a necessity for complicated processing high in recognition accuracy in recognizing a character area, consequently making it possible to print a high-quality image conveniently.

No reference can be made to the first table at a part of the first table in which the second table is embedded. However, since RGB respective components corresponding to the above part are hardly used in image data, a substantial part of the image data can be converted to used amounts of inks by referring to the first table. Specifically, the part in which the second table is embedded is an area close to a ridge line where, of the RGB respective components, two components are given as an upper limit or a lower limit. In RGB image data read from a print image, there is a tendency that the RGB respective components are less likely to take extreme values such as an upper limit and a lower limit, thereby there is hardly found such a case that, of the RGB respective components, two components are both given as an upper limit or a lower limit. Therefore, if the second table is embedded in the above-described area, it is possible to convert the image data to the used amounts of inks by referring to the first table.

Further, in the above-described printing method of the present invention, in a case where second RGB components of image data corresponding to an area other than the character area are located within the ridge area, the second RGB components may be converted into third RGB components located outside of the ridge area. In this instance, they are changed to the RGB respective components at a position closer to original RGB respective components. For example, the RGB respective components on the ridge line are allowed to move along a flat plane orthogonal to the ridge line toward the center of the RGB color solid up to a point where they are out of the ridge line area, thereby obtaining the RGB respective components at a position outside the ridge line area, by which they are changed to the RGB respective components in the vicinity. Alternatively, in search of a line segment which is shortest in distance from the ridge line to a border plane of the ridge line area to obtain the RGB respective components positioned at the end of the line segment, they may be changed to the RGB respective components nearest to a position outside the ridge line area.

Thereby, a part other than the character area will not refer to the second corresponding table embedded in a ridge line area, and there is no chance that the part other than the character area is printed by achromatic color inks. Further, in changing RGB respective components, they are changed to RGB respective components which are near to original RGB respective components, thereby there is no great change in color or lightness at a part where the RGB respective components are changed. As a result, even if a part other than the character area has the RGB respective components in the ridge line area, it is possible to print a high quality image.

Further, in the above-described printing method of the present invention, the two of the RGB components may be an R component and a G component.

RGB respective components corresponding to a ridge line on which the R component and the G component are given as a maximum value correspond to yellow color. Humans tend to be less visually sensitive to yellow color when there is a change in brightness or conversion of saturation. Therefore, when a yellow part of the first corresponding table is partially changed to create an open space in order to embed the second corresponding table, the above processing hardly affects the image quality and a high-quality image can be printed. Further, where image data other than the character area having RGB respective components on the yellow ridge line is changed to other RGB respective components in the vicinity of the ridge line, because there is no conspicuous change in lightness or color, it is possible to print a high quality image in which a manuscript image is reproduced almost faithfully.

According to an another aspect of the invention, there is provided a method for creating a table indicating a relationship between first gradation values and second gradation values, the first gradation values including at least one achromatic color component and at least three chromatic color components used in printing an image, the second gradation values including RGB respective components, the method including: setting a plurality of first lattice points in an RGB color solid defined by RGB components; storing a first table indicating a relationship between a color defined by each of the first lattice points and the first gradation values; storing a second table indicating a relationship between one of a plurality of brightness values and a gradation value of the achromatic color component for representing the one of the brightness values; storing information indicating a relationship between the brightness values and some of the first lattice points located at a ridge area including a ridge line of the RGB color solid at which two of the RGB components take either maximum values or minimum values thereof; and generating a third table in which the second table is embedded in the first table based on the information.

In the corresponding table creating method of the present invention, there is stored the first table in which lattice points provided on the RGB color solid are allowed to correspond to the first gradation value set. There is also stored the second table in which brightness values are allowed to correspond to gradation values of the achromatic color components. Further, lattice points in a predetermined area including a ridge line of the RGB color solid are allowed to correspond to the brightness values and duly stored. Then, on the basis of the above-described corresponding relationship, the first gradation value set which is allowed to correspond to the ride line lattice points by the first table is changed to the first gradation value set which is allowed to correspond to the brightness values by the second table, thus creating a third table (synthesis table).

Therefore, for example, the used amounts of achromatic color inks and chromatic color inks are previously stored as the first gradation value set in the first table, and the used amounts of achromatic color inks are previously stored as the first gradation value set in the second table, thus making it possible to create easily a synthesis table used in the printing method or by the printing apparatus of the present invention. As a result, it is possible to print a high-quality image both at a character area and at parts other than the character area. Further, the synthesis table can be created as described above, thereby eliminating a necessity for referring to two tables, that is, the first table and the second table. Thus, the processing is not complicated and image data can be conveniently converted to the first gradation value set. As a result, it is possible to print a high quality copy image.

According to an another aspect of the invention, there is provided a computer program product storing a computer program configured to causing a computer to execute the method according to the above-disclosed method for printing the image.

According to an another aspect of the invention, there is provided a computer program product storing a computer program configured to causing a computer to execute the method according to the above-disclosed method for creating the table indicating the relationship between the first gradation values and the second gradation values.

The above programs are read into a computer to execute each of the above-described functions, thus making it possible to output conveniently a high-quality copy image.

BRIEF DESCRIPTION OF THE DRAWINGS

Embodiment may be described in detail with reference to the accompanying drawings, in which.

DETAILED DESCRIPTION OF THE INVENTION

Figure 1:
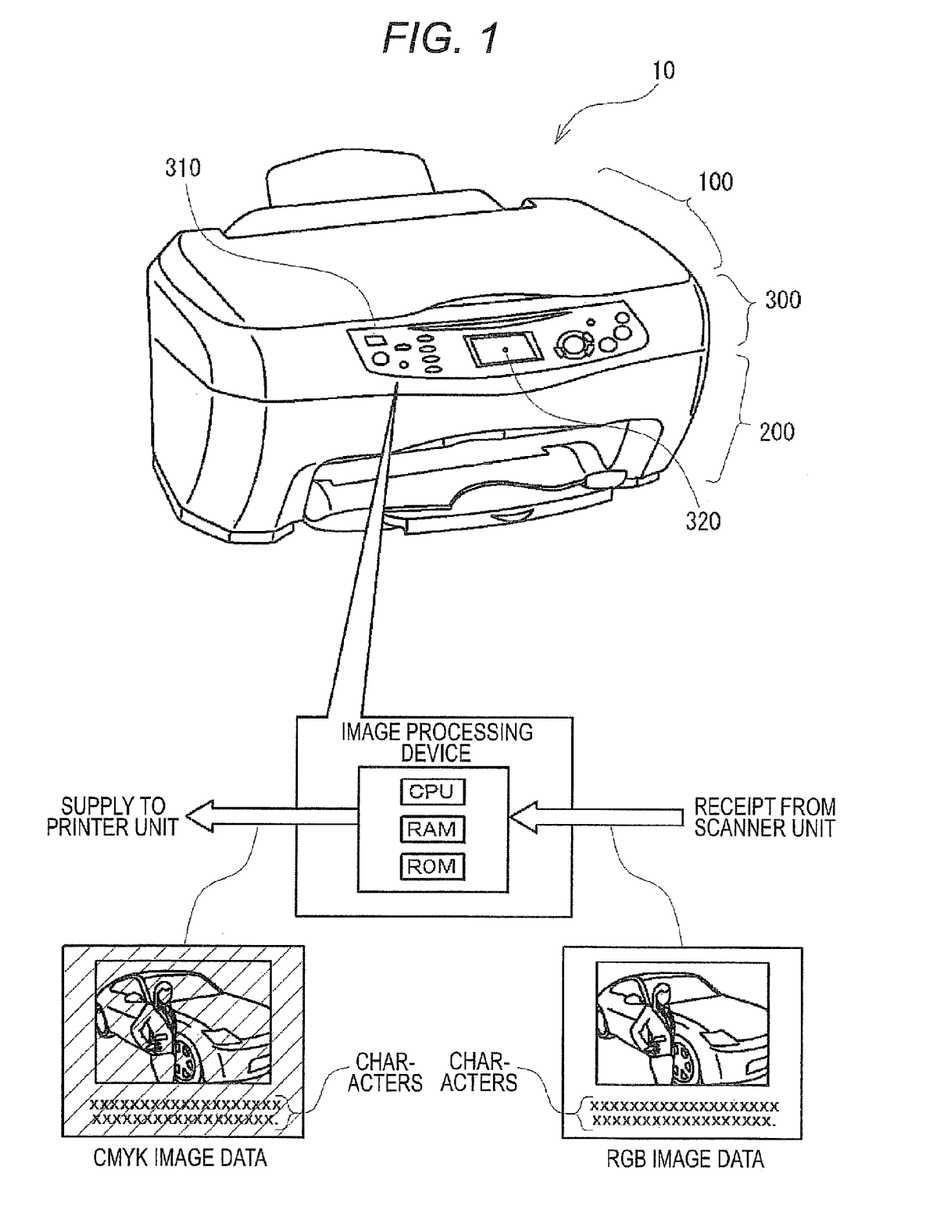
FIG. 1 is a drawing for explaining a printing apparatus on which the image processing device of the present embodiment is mounted.

FIG. 1 is a perspective view showing a printing apparatus having an image processing device of the present embodiment. As illustrated in the drawing, the printing apparatus 10 is constituted with a scanner unit 100, a printer unit 200, a control unit 300 for controlling motions of the scanner unit 100 and the printer unit 200. The scanner unit 100 is provided with scanner functions of reading a printed image to create image data, and the printer unit 200 is provided with printer functions of receiving the image data to print an image on a printing medium. Further, an image read by the scanner unit 100 is output from the printer unit 200, thus making it possible to realize copy functions. Specifically, the printing apparatus 10 of the present embodiment is able to realize the scanner functions, the printer functions and the copy functions by itself, which is a so-called multi-function scanner/printer/copier machine.

Further, the printing apparatus 10 is equipped on the control unit 300 with a CPU, a ROM, a RAM and others, thus making it possible to execute various types of image processing by the CPU and others in the control unit 300. Specifically, the control unit 300 not only controls the scanner unit 100 and the printer unit 200 but also acts as an image processing device. Then, the printing apparatus 10 of the present embodiment is able to print a higher quality image due to the image processing device. For example, where the copy function is executed to read a manuscript image through the scanner unit 100, black-color characters on the manuscript image will develop a tinge of gray color. Thus, if the image is printed as it is, characters are seemingly faded. For this reason, when the image is copied to produce a copy image, there is a tendency that apart of characters is in particular reduced in image quality. With this point taken into account, the printing apparatus 10 of the present embodiment is able to execute by the image processing device image processing in which a high-quality copy image can be output even at a part of characters.

FIG. 1 shows in terms of concept a way in which image data read by the scanner unit 100 is processed by the image processing device of the present embodiment. The image processing device of the present embodiment gives color conversion processing to the image data upon receipt of the image data from the scanner unit 100, thereby creating CMYK image data used in printing by the printer unit 200. The CMYK image data expresses an image by using CMYK gradation values corresponding to the respective amounts of CMYK inks used in printing by the printer unit 200, and the image is printed by outputting the inks by the printer unit 200 on the basis of the CMYK image data. In this instance, the image processing device of the present embodiment executes special color conversion processing to be described later, thereby creating appropriate CMYK image data so as to provide a high-quality image even at a part of characters.

Thereby, it is possible to print a high-quality copy image at the part of characters. Hereinafter, a description will be given for the processing executed by the control unit 300 by referring to a flow chart.

Figure 2:
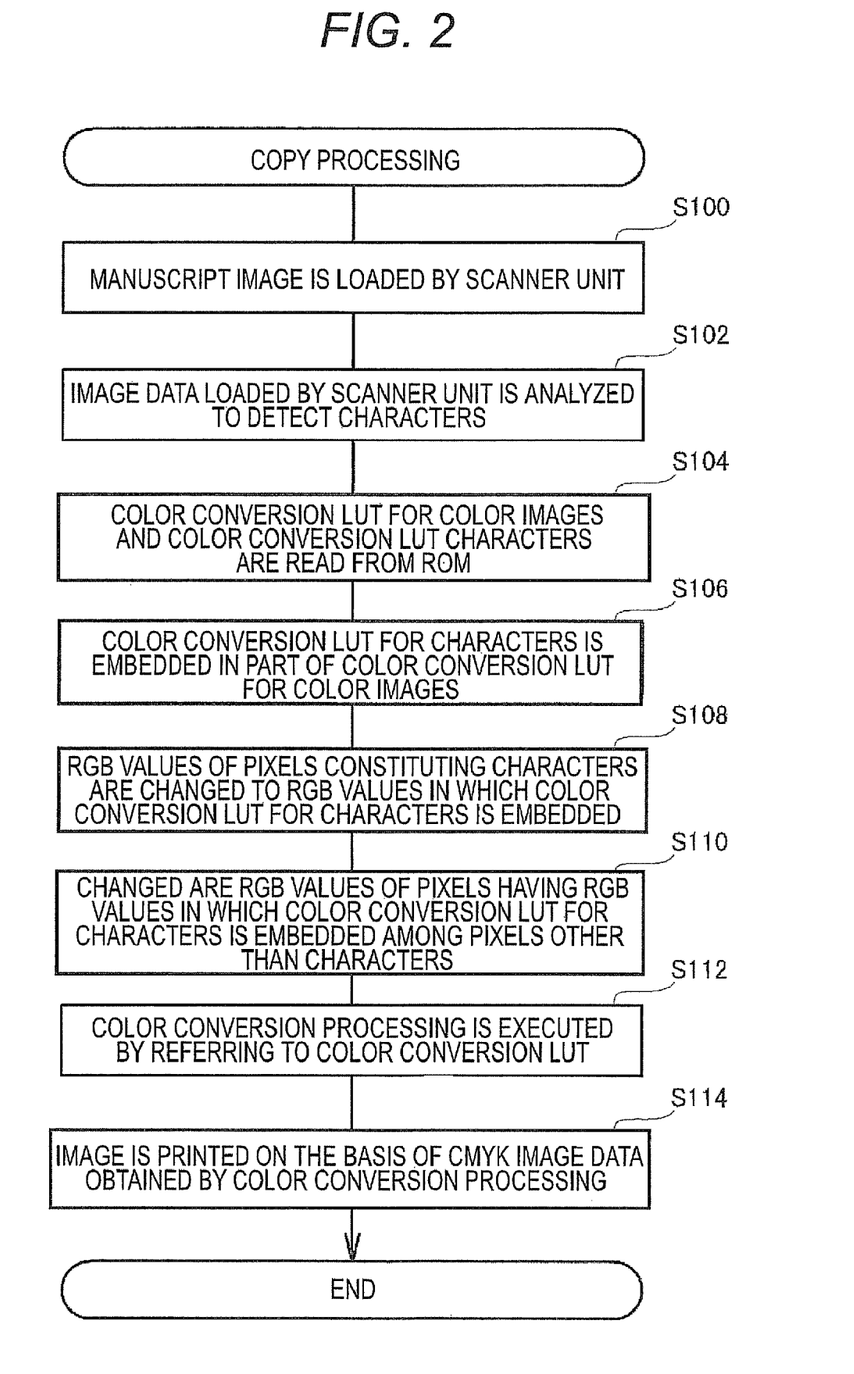
FIG. 2 is a flow chart showing a flow of copy processing of the present embodiment.
Figure 3:
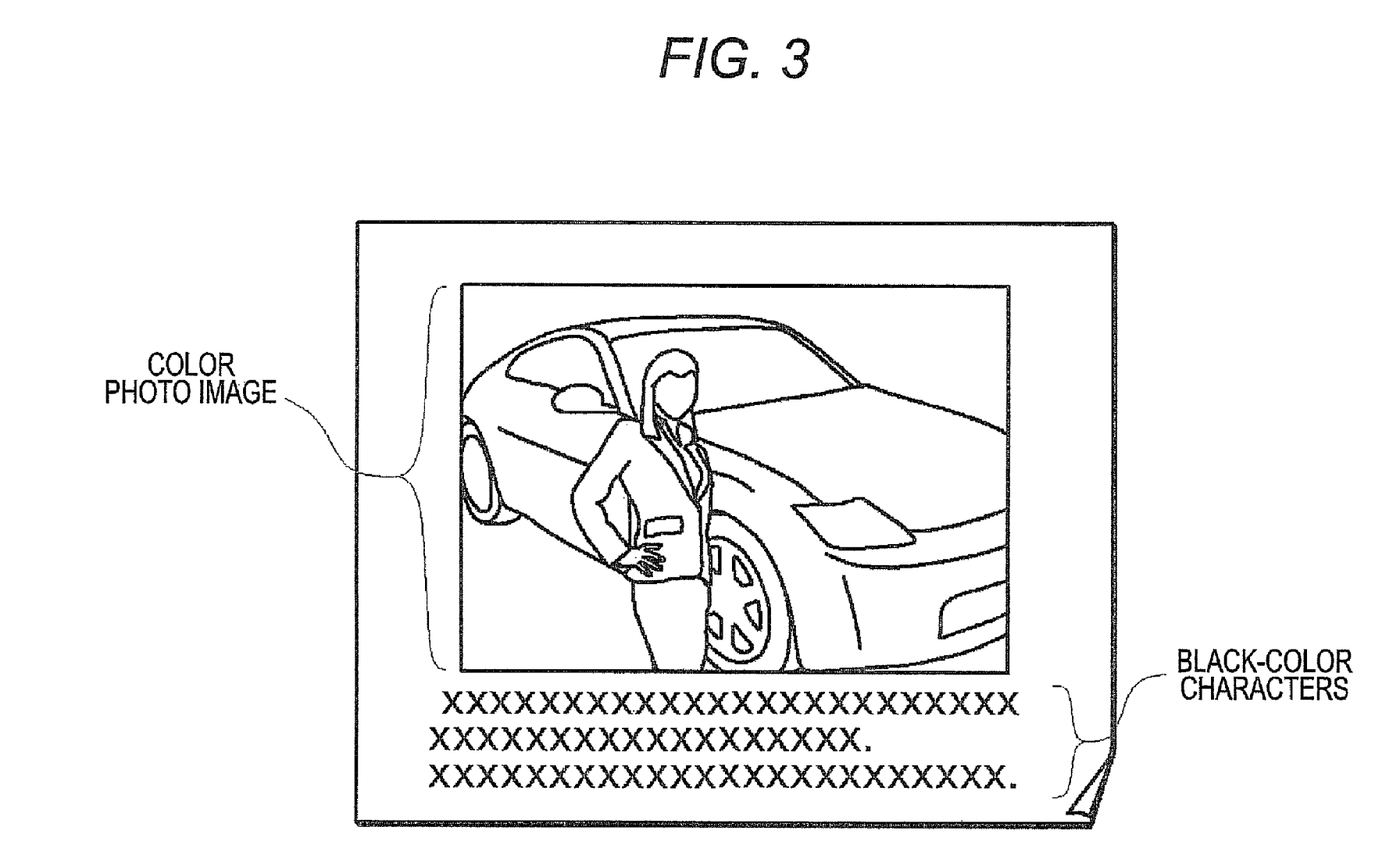
FIG. 3 is a drawing for explaining an example of an image which is subjected to the copy processing.

FIG. 2 is a flow chart showing the flow of "copy processingg" in the present embodiment. This processing is that which is executed by the control unit 300 when a user sets a manuscript on the scanner unit 100 to operate an operation panel 310. Upon start of the copy processing, the control unit 300 first executes processing in which the scanner unit 100 is actuated to read a manuscript image as RGB image data (Step S100). In this instance, as exemplified in FIG. 3, the present embodiment is to load a manuscript which is a mixture of color photo images and black-color characters.

The scanner unit 100 is actuated to load the manuscript image as RGB image data, and then such processing is executed that characters are detected from the thus loaded RGB image data (Step S102 in FIG. 2). Characters in the image can be detected by using various methods. For example, characters desired for detection are stored for shape, the image data is subjected to analysis, thereby an object conforming with the shape of a particular character may be searched in the image. Further, as a simpler method, RGB gradation values of respective pixels of image data may be determined to select a pixel having RGB values corresponding to black color of the character. As a matter of course, there is a case where a part other than characters may have the RGB gradation values of black color. Thus, after selection of a part of a black color, determination is further made for whether or riot the shape of the part conforms with the part of a character, thus making it possible to detect the character correctly.

After detection of characters as described above, in order to create CMYK image data used in printing a copy image, processing is executed in which a conversion table (color conversion LUT (look-up table)) for conversion from RGB image data to CMYK image data is read from a ROM (Step S104). In this instance, the printing apparatus 10 of the present embodiment stores on a ROM two color conversion LUTs, that is, a color conversion LUT for color images and a color conversion LUT for characters. In this instance, these two color conversion LUTs are read from the ROM.

Figure 4:
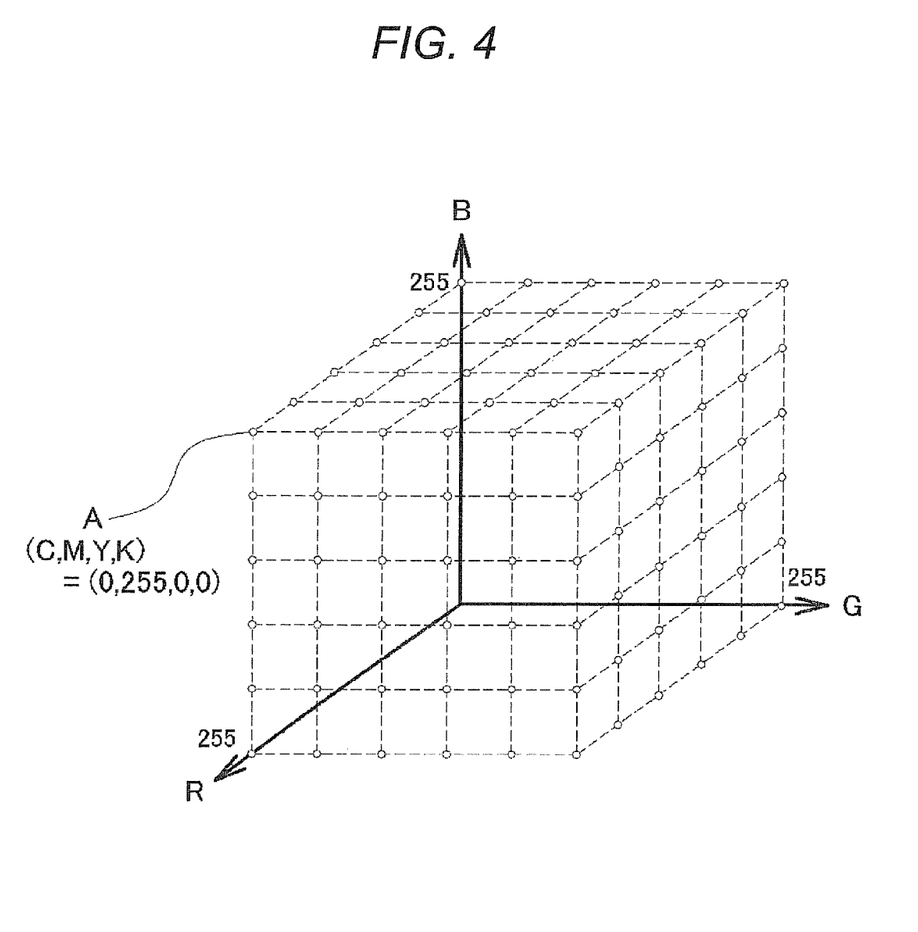
FIG. 4 is a drawing for explaining an example of color conversion LUT for color images.

FIG. 4 is a drawing for explaining the color conversion LUT for color images. As illustrated, the color conversion LUT for color images is a three-dimensional corresponding table in which CMYK respective gradation values are allowed to Correspond to lattice points within a three-dimensional coordinate space having RGB respective components as a coordinate axis. A set of RGB respective gradation values corresponds to one point within the three-dimensional coordinate space, thereby CMYK values set at the point can be read to change RGB gradation values to CMYK gradation values. For example, a lattice point indicated as "A" in the drawing correspond to RGB gradation values (R, G, B)=(255, 0, 255), and (C, M, Y, K)=(0, 255, 0, 0) are allowed to correspond to the lattice point as CMYK gradation values. Therefore, these RGB gradation values (255, 0, 255) can be converted to the CMYK gradation values (0, 255, 0, 0). Further, regarding the RGB gradation values on which a lattice point is not set, interpolation computing may be conducted to calculate the CMYK gradation values.

Figure 5A:
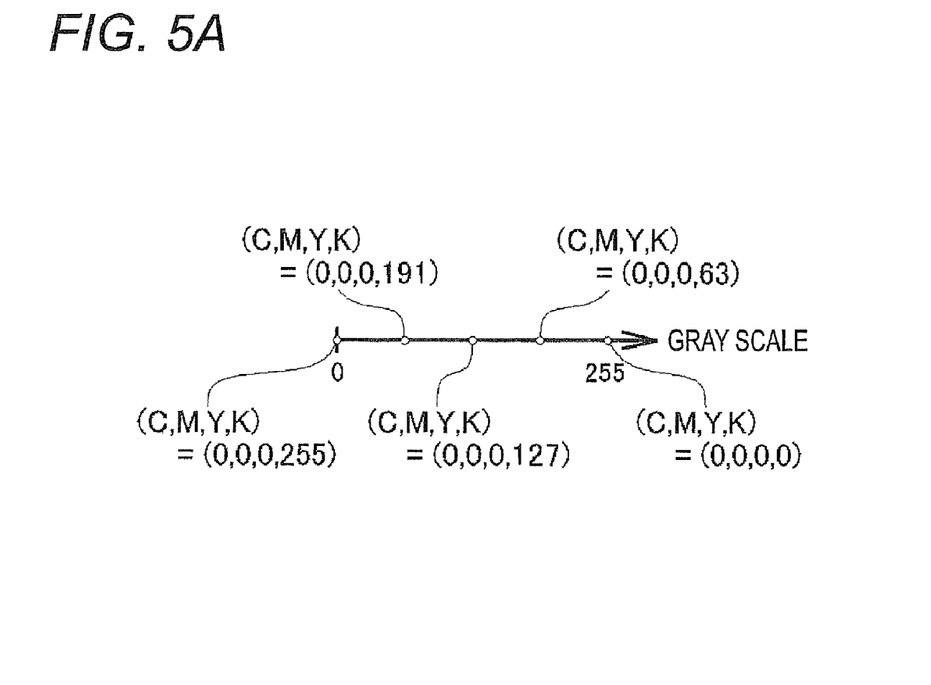
FIGS. 5A and 5B are drawings for explaining an example of color conversion LUT for characters.
Figure 5B:
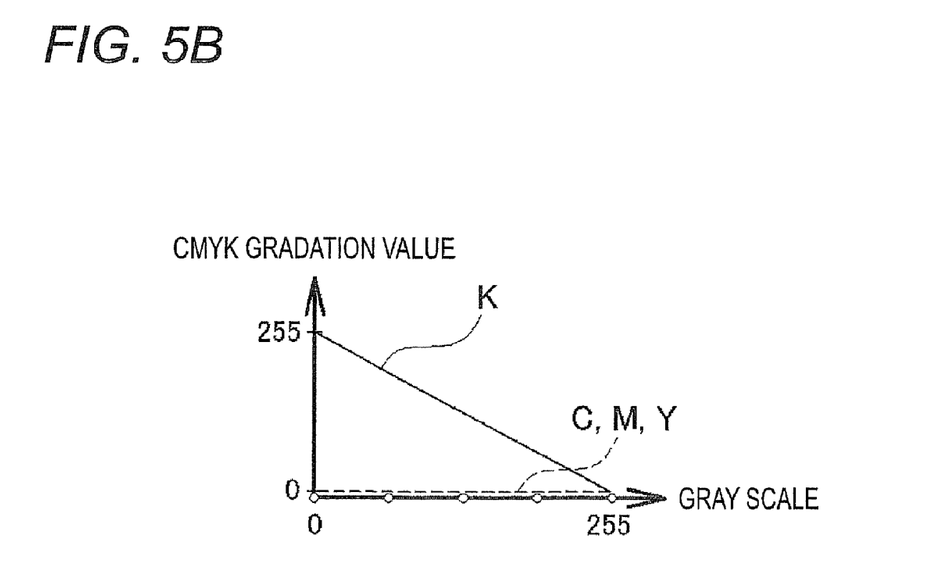

FIGS. 5A and 5B are drawings for explaining the color conversion LUT for characters. As shown in FIG. 5A, the color conversion LUT for characters is a one-dimensional corresponding table in which CMYK gradation values are set for one parameter. Specifically, the color conversion LUT for characters is to respond to colors such as black or gray which can be expressed by using one parameter, thus making it possible to convert black color and gray color to CMYK gradation values by setting the CMYK gradation values to this parameter. For example, in RGB image data, black color is expressed by RGB gradation values (0, 0, 0). Since the RGB gradation values are all "0," black color can be expressed by one parameter of "0." Similarly, gray color is expressed by RGB gradation values (128, 128, 128), and since the RGB gradation values are all "128," gray color can be expressed by one parameter of "128." Therefore, CMYK gradation values are set to the above-described one parameter, thus making it possible to convert black color and gray color to the CMYK gradation values. Thus, the color conversion LUT for characters is a one-dimensional corresponding table in which the CMYK gradation values are allowed to correspond to one parameter. In addition, the parameter is referred to as a gray scale in the present embodiment.

Further, as described above, in the RGB image data, a value which is equal in RGB respective components may be given as a gray scale. However, other various values may also be used as the gray scale. For example, where image data is expressed by a HSV color specification system, it is expressed by each gradation value of hue value (H), saturation value (S) and brightness value (V). Since black color or gray color is free of the hue value or the saturation value (H=0, S=0), black color and gray color can be expressed by using the brightness value only. Therefore, in this instance, the brightness value (V) can be used as the gray scale, Similarly, other various gradation values can be used as the gray scale. For example, where a YCC color specification system is used, the brightness value (Y) can be used as the gray scale.

In this instance, as shown in FIG. 5A, the color conversion LUT for characters sets all CMY gradation values to be "0," with only the gradation value of K set to a value having a magnitude corresponding to the gray scale. FIG. 5B shows a graph covering the respective gradation values which are allowed to correspond to the gray scale. A minimum value "0" of the gray scale corresponds to a perfect black color, and as a value grows greater from the minimum value, black color gradually changes to gray color in a tinge of white color, thus corresponding to a perfect white color at a maximum value of "255." Accordingly, a K gradation value (corresponding to a used amount of black ink) is set so as to give a maximum value of "255" where the gray scale is a minimum value of "C," while giving a minimum value of "0" where the gray scale is a maximum value of "255."

On the other hand, CMY respective gradation values (corresponding to used amounts of CMY respective color inks) are all set to be "0" due to the following reasons. Specifically, black color and gray color can be expressed by superimposing CMY respective color inks approximately at an equal amount. However, where CMY respective color inks are used to print characters, there is a tendency that inks ooze to blur the outlines of the characters due to an increased amount of the inks. Further, where black color is expressed by superimposing CMY respective color inks, the color inevitably takes on a tinge of gray color, thus resulting in a tendency that the characters are seemingly faded. Due to the above-described reasons, the CMY respective color inks are not used in printing, thereby CMY gradation values are all set to be "0" in the color conversion LUT for characters.

As described above, in the present embodiment, the color conversion LUT for color images and the color conversion LUT for characters are previously stored on a ROM. Therefore, a part of characters is subjected to color conversion processing by using the color conversion LUT for characters shown in FIGS. 5A and 5B, and a part other than the characters is subjected to color conversion processing by using the color conversion LUT for color images shown in FIG. 4, by which favorable CMYK image data is to be obtained. However, in reality, an attempt to use these two color conversion LUTs in color conversion processing will require such processing that the two color conversion LUTs are switched depending on whether a part concerned is a part of characters or not. Thereby, the color conversion processing is complicated to result in a failure of obtaining CMYK image data conveniently. Therefore, in the copy processing of the present embodiment, these two color conversion LUTs are not used in color conversion processing as they are, but such processing is executed that the color conversion LUT for characters is first embedded in the color conversion LUT for color images to create a new color conversion LUT (Step S106 in FIG. 2).

Figure 6A:
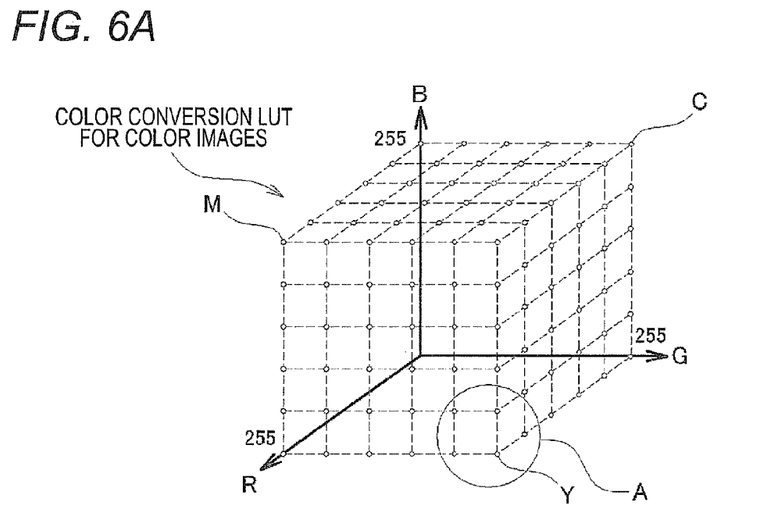
FIGS. 6A and 6B are drawings for explaining a way of embedding the color conversion LUT for characters in the color conversion LUT for color images.
Figure 6B:
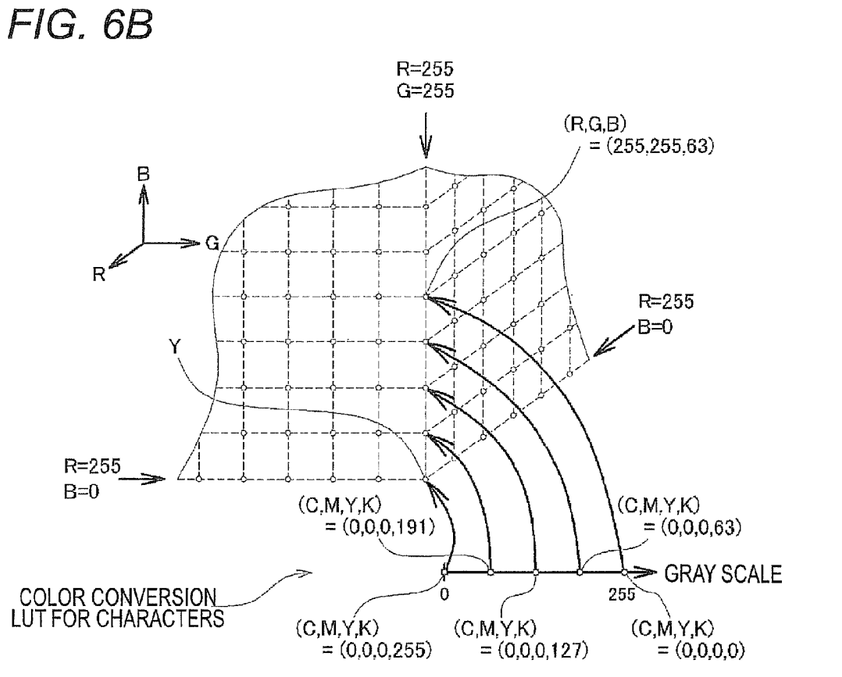

FIGS. 6A and 6B are drawings for explaining a way of embedding the color conversion LUT for characters in the color conversion LUT for color images. The color conversion LUT for characters and the color conversion LUT for color images are originally a different LUT. Thus, it is desirable that the color conversion LUT for characters is embedded at a part of the color conversion LUT for color images which is least used. Therefore, the color conversion LUT for characters is embedded in a corner of the color conversion LUT for color images. For example, the color conversion LUT for characters may be embedded along a ridge line connecting a lattice point which is indicated as "M" in FIG. 6A with the B axis or may be embedded along a ridge line connecting a lattice point indicated as "M" with the R axis. In this instance, the color conversion LUT for characters is to be embedded along a ridge line extending from the lattice point indicated as "Y" in the drawing upward (ridge line parallel with B axis).

FIG. 6B is an enlarged drawing showing a part indicated as "A" in FIG. 6A This drawing shows a way of embedding the color conversion LUT for characters from the lattice point indicated as "Y" in the drawing upward. As illustrated in the drawing, CMYK gradation values which are allowed to correspond to a lattice point of a minimum value of "0" in a gray scale is set to the lattice point indicated as "Y" in the drawing. Specifically, the CMYK gradation values at the lattice point indicated as "Y" in the drawing are converted to CMYK gradation values (0, 0, 0, 255) which are allowed to correspond to a lattice point of the gray scale. Similarly, CMYK values at a lattice point greater by one than the lattice point of "Y" are converted to CMYK gradation values (0, 0, 0, 191) at a lattice point next to the lattice point of a minimum value in the gray scale. Other lattice points are similarly converted to CMYK values set at the respective lattice points of the gray scale. Thereby, obtained is a new color conversion LUT in which the color conversion LUT for characters is embedded along a ridge line from the lattice point indicated as "Y" in the drawing.

Even if the color conversion LUT for characters is embedded in the color conversion LUT for color images as described above, there will be no significance unless a reference is made to the embedded part in actually subjecting a part of characters to color conversion. Therefore, pixels constituting previously detected characters are processed for conversion of RGB gradation values of the respective pixels (refer to Step S102 in FIG. 2) so that a part in which the color conversion LUT for characters is embedded can be referred by the part of characters on color conversion (Step S108).

Figure 7A:
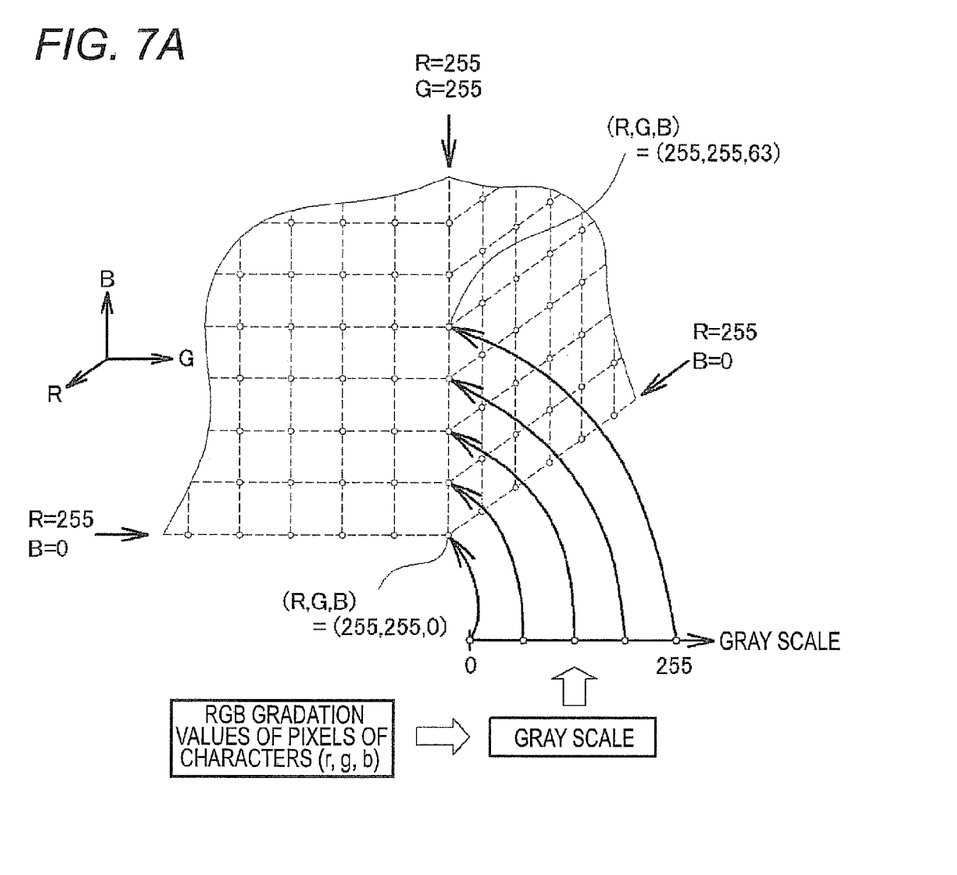
FIGS. 7A and 7B are drawings for explaining a way of changing RGB gradation values of pixels constituting characters.
Figure 7B:
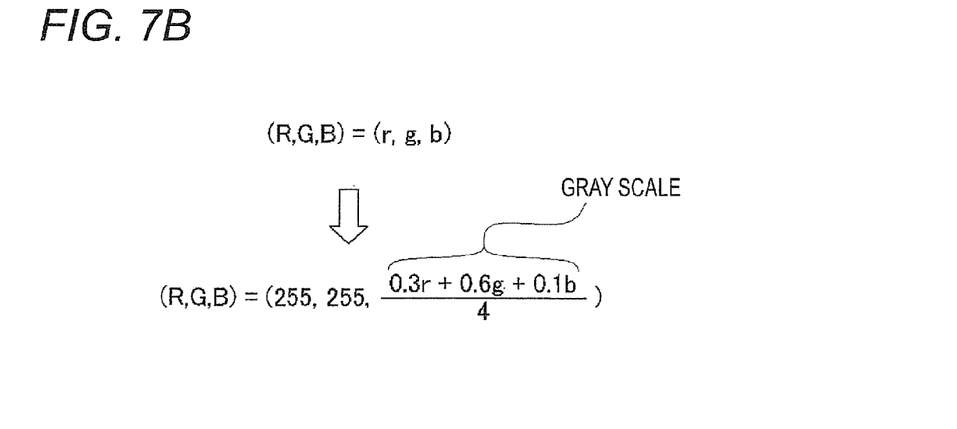

FIGS. 7A and 7B are drawings for explaining a way of changing RGB gradation values of pixels constituting characters so as to refer to a part in which the color conversion LUT for characters is embedded. As described previously, the color conversion LUT for characters is embedded in a part of a cubic ridge line shown in FIG. 7A. Therefore, the RGB gradation values of pixels constituting characters are changed to the RGB gradation values at this part, by which a part in which the color conversion LUT for characters is embedded can be referred. In this instance, a gray scale is allowed to correspond to CMYK gradation values in the color conversion LUT for characters. Thus, in order to change the RGB gradation values of pixels of characters to a part of the color conversion LUT for characters, calculation is first made for the gray scale of pixels to be changed. As described previously, since the gray scale includes a Y gradation value in a YCC color specification system and a V gradation value in a HSV color specification system, these values are calculated from the RGB gradation values of pixels, thus making it possible to obtain the gray scale of the pixel concerned. After the gray scale of pixels of characters is obtained, in search for a place in which CMYK gradation values corresponding to the gray scale are embedded, the RGB gradation values of pixels are changed to the RGB gradation values at the place thereof. For example, the gray scale of the pixel is "0", the CMYK gradation values corresponding to the gray scale, "0," are embedded in a lattice point of the RGB gradation values (256, 255, 0) (refer to FIG. 6B). Therefore, the RGB gradation values of the pixel concerned may be changed to the RGB gradation values at this lattice point (255, 255, 0). Similarly, where the gray scale of the pixel is "255," the CMYK gradation values corresponding to the gray scale, "255" are embedded in a lattice point of the RGB gradation values (255, 255, 63). Therefore, the RGB gradation values of the pixel may be changed to the RGB gradation values at this lattice point (255, 255, 63).

FIG. 7B shows a method for changing the RGB gradation values of pixels constituting these characters by formulae. As shown by the formulae in FIG. 7B, since regarding a R gradation value and a G gradation value, the color conversion table for characters is embedded on a ridge line of "R gradation value=255" and "G gradation value=255," the R gradation value and the G gradation value may be respectively changed to "255." On the other hand, a B gradation value may be determined from a gray scale obtained by calculating the gray scale from RGB gradation values of pixels as shown in the formulae. As described so far, the RGB gradation values of pixels constituting characters are changed, by which a part of characters can be referred to a part in which the color conversion table for characters is embedded on color conversion.

After pixels constituting characters are changed in RGB gradation values, pixels other than characters are processed so as to change the RGB gradation values. Specifically, the color conversion processing is executed as it is, and if there is found a pixel having the RGB gradation values at a part in which the color conversion LUT for characters is embedded in RGB image data read by a scanner unit 100, the pixel is subjected to color conversion to CMYK gradation values for characters. As a result, colors greatly different from original colors (black color and gray color) will be printed. Thus, confirmation is made for whether or not there is a pixel corresponding to a part into which the color conversion LUT for characters is embedded in the RGB image data read by the scanner unit 100. Where the corresponding pixel is found, the pixel is changed in RGB gradation values (Step S110 in FIG. 2).

Figure 8A:
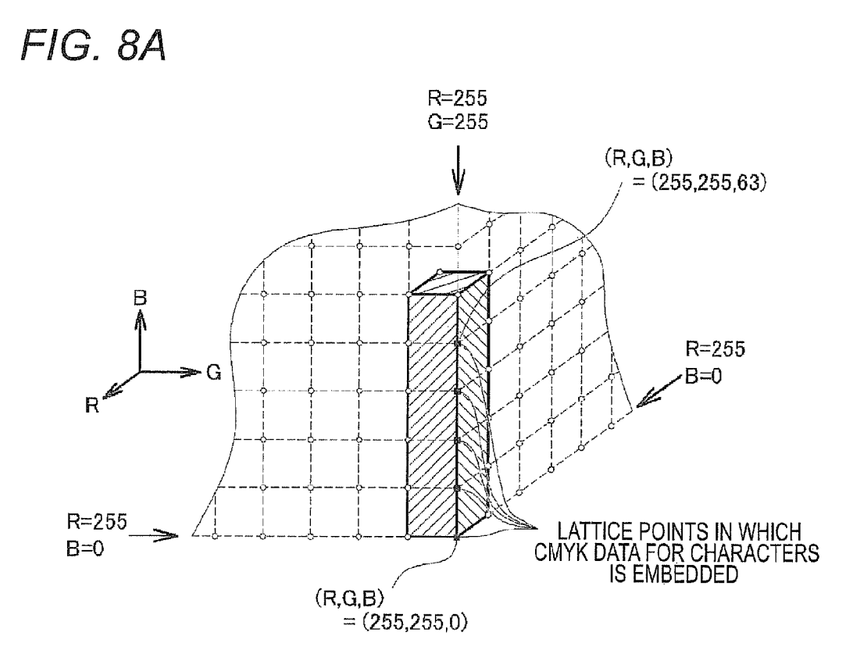
FIGS. 8A and 8B are drawings for explaining a way of changing the RGB gradation values at a part in which the color conversion LUT for characters is embedded.
Figure 8B:
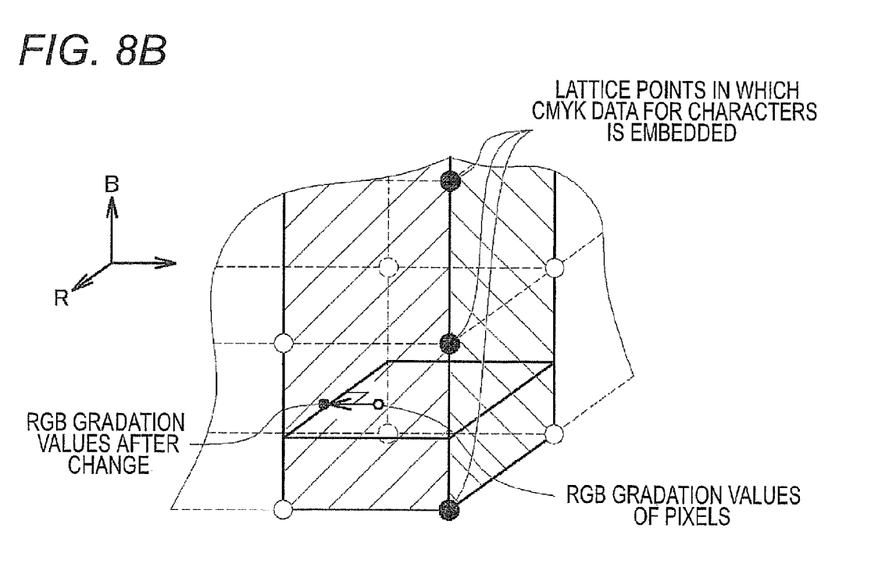

FIGS. 8A and 8B are drawings for explaining a way of changing RGB gradation values where the RGB image data read by the scanner unit 100 includes a pixel having the RGB gradation values at a part in which the color conversion LUT for characters is embedded. In this instance, as previously described by referring to FIG. 6, the part in which the color conversion LUT for character is embedded is a part of the ridge line shown in FIGS. 6A and 6B. However, in reality, only a change in a pixel having the RGB gradation values corresponding to the part of this ridge line will not be sufficient. In other words, all the pixels having the RGB gradation values corresponding to a hatched area in FIG. 8A must be changed. This is because, as described previously, in executing the color conversion processing by using the color conversion LUT, a plurality of lattice points enclosing the RGB gradation values are used to conduct interpolation computing, thus obtaining the CMYK gradation values, and not only the RGB gradation values at a lattice point in which the color conversion LUT for character is embedded but also the RGB gradation values near the lattice point are influenced by the lattice point in which the color conversion LUT for characters is embedded on color conversion processing. Therefore, it is necessary to not only change the RGB gradation values of pixels at the lattice point in which the color conversion LUT for characters is embedded but also change the RGB gradation values near the lattice point (the hatched area in FIG. 8A). In changing the RGB gradation values of pixels, the RGB gradation values may be changed to the RGB gradation values other than the hatched area. However, a great change in RGB gradation values will result in a great change in colors to develop an unnatural image. Therefore, the RGB gradation values are changed to those similar to original RGB gradation values. For example, as shown in FIG. 8B, the RGB gradation values of pixels are moved parallel with a coordinate axis, thereby the values are changed to the RGB gradation values at the nearest position other than the hatched area.

As described so far, the pixel at a part of characters and the pixel at a part other than characters in RGB image data are changed in RGB respective gradation values, the previously created color conversion LUT is used (refer to Step S106 in FIG. 2) to execute color conversion processing from RGB image data to CMYK image data (Step S110). In the color conversion processing, as described previously, RGB gradation values of pixels of the RGB image data are changed to CMYK gradation values by referring to the color conversion LUT. Thereby, after the CMYK image data is obtained, a control unit 300 supplies the CMYK image data to a printer unit 200. Upon receipt of the data, the printer unit 200 ejects CMYK respective inks in amounts corresponding to the CMYK gradation values, thus printing a copy image (Step S112). After the printer unit 200 prints the copy image, the control unit 300 completes the copy processing shown in FIG. 2.

As so far described, in the copy processing of the present embodiment, the color conversion LUT for characters is embedded in the color conversion LUT for color images, thereby creating a new color conversion LUT and also executing processing which changes RGB image data. Then, the thus changed RGB image data is subjected to color conversion processing by using the created color conversion LUT to create CMYK image data. Thereby, it is possible to obtain the CMYK image data capable of outputting a high-quality image even at a part of characters. As a result, copy images of favorable quality can be printed not only at a part of color photo images but also at a part of characters. In addition, these high-quality copy images can be conveniently printed without complicating the color conversion processing. Hereinafter, a description will be given for reasons which make the above fact possible.

Figure 9:
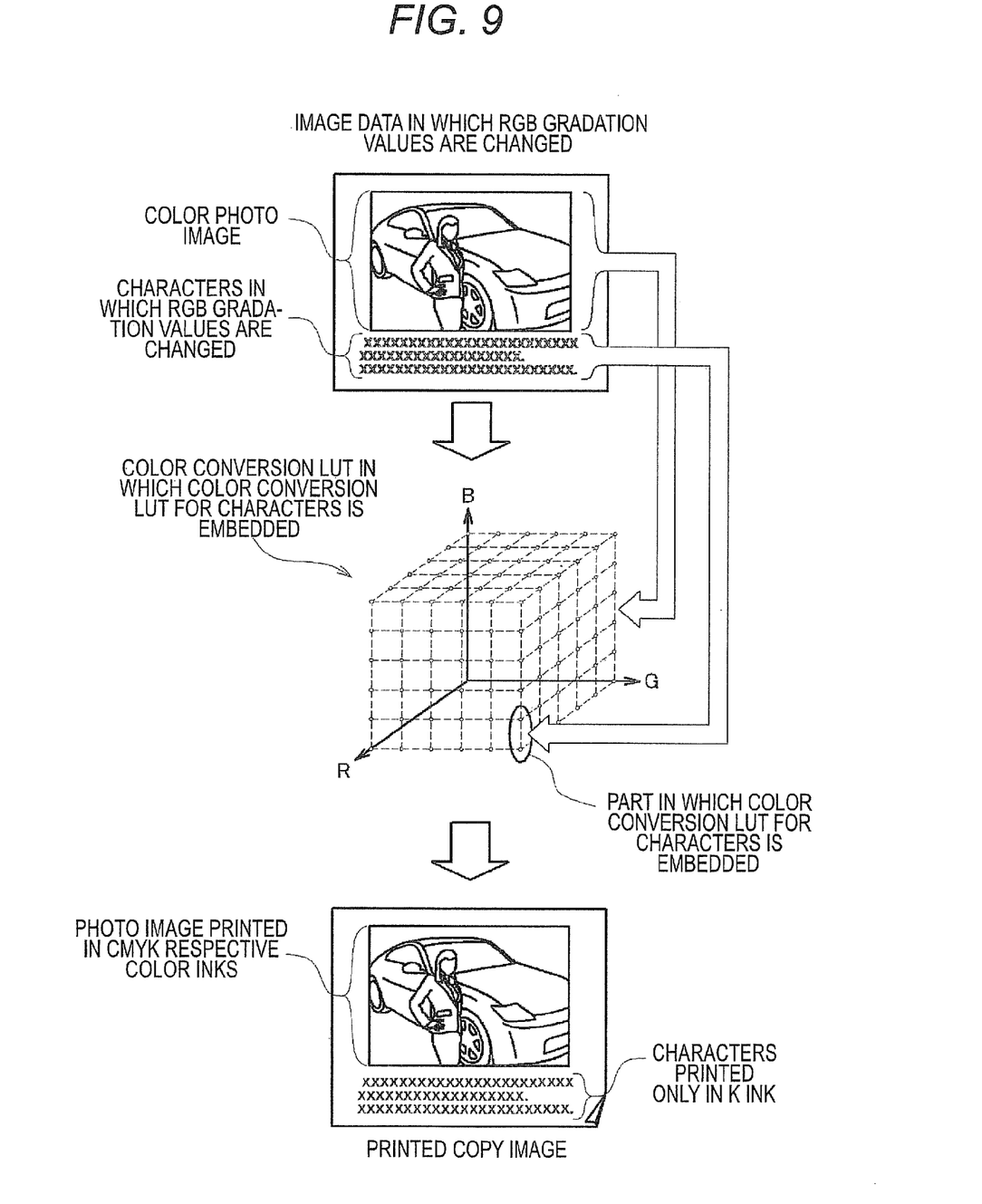
FIG. 9 is a drawing for explaining in terms of concept a way of obtaining conveniently a high-quality copy image by the copy processing of the present embodiment.

FIG. 9 is a drawing for explaining reasons why a high-quality copy image can be obtained by the copy processing of the present embodiment. RGB image data for executing the color conversion processing is shown above in the drawing. In this instance, the RGB image data is, as described previously, changed in RGB gradation values at a part of characters (refer to Step S108 in FIG. 2 and also refer to FIGS. 7A and 7B). Further, a color conversion LUT created by embedding the color conversion LUT for characters in the color conversion LUT for color images is shown at the center of the drawing (refer to Step S106 in FIG. 2 and also refer to FIGS. 6A and 6B). The image data which has been changed in RGB gradation values is subjected to color conversion processing by using the color conversion LUT. Then, a part of a photo image is changed to CMYK gradation values corresponding to RGB gradation values, thereby obtaining CMYK image data corresponding to an original photo image. On the other hand, since a part of characters has been changed in RGB gradation values, a reference is made to a part in which the color conversion LUT for characters is embedded. As a result, the part is subjected to color conversion to CMYK gradation values in which only K ink is used.

A copy image printed on the basis of the thus obtained CMYK image data is shown below FIG. 9. A part of a photo image is subjected to color conversion processing by referring to the color conversion LUT for color images, thereby a favorable image is printed by using CMYK respective color inks. On the other hand, since a part of characters is printed by using only K ink, there is no reduction in image quality that is found as a blurred image when CMY respective color inks are used. Therefore, according to the copy processing of the present embodiment, it is possible to obtain copy images of favorable quality not only at the part of photo image but also at the part of characters.

At parts other than characters such as a part of a photo image, pixels corresponding to a part in which the color conversion LUT for characters is embedded are changed in RGB gradation values (refer to Step S110 in FIG. 2 and also to FIGS. 8A and 8B). There are hardly found influences on the image quality resulting from the above description, because pixels which need a change in RGB gradation values will be actually small in number due to the following reasons. Specifically, in image data loaded by a scanner unit 100, there is a tendency that RGB gradation values corresponding to a part of a ridge line in a space of RGB gradation values (a part in which the color conversion LUT for characters is embedded)

are not used frequently. This is derived from the fact that the scanner unit 100 detects light scattered by a manuscript image to read an image. For example, as described previously, where black-color characters are read, even the black-color characters will scatter light to some extent. And in the thus obtained RGB image data, there is a rare case where RGB gradation values are all "0" (corresponding to a perfect black color), but in most cases, RGB respective gradation values will have some values. Therefore, in the RGB image data loaded by the scanner unit 100, there is a tendency that the vicinity of the RGB gradation values (0, 0, 0) is not used. Further, the above fact is not necessarily found only in the case of black color. In general, in the RGB image data loaded by the scanner unit 100, there is a tendency that a part in which any of the RGB gradation values is "0" is not used. As a matter of course, the above tendency is found more conspicuously on each axis of R axis, G axis and B axis where, among the RGB respective gradation values, two gradation values are "0."

There is also a tendency that the vicinity at which a minimum value is "0" or a maximum value is "255" is not frequently used in the RGB image data loaded by the scanner unit 100. For example, where a red-color part is found on a manuscript image, red-color light is not completely scattered. Thereby, R gradation value is rarely given as a maximum value "255." Similarly, there is a tendency that G gradation value or B gradation value is not used in the vicinity of a maximum value "255." Due to the above-described reasons, there is a tendency that a part of a cubic ridge line in a RGB coordinate space (among RGB respective gradation values, at least two gradation values are "0" or "255") is not used in the RGB image data loaded by the scanner unit 100. Therefore, in reality, there is often a case where pixels corresponding to the above-described ridge line parts do not exist. Even in a case where they do exist, they are small in number. Therefore, if these pixels are changed in RGB gradation values, there is hardly found a difference between an original manuscript image and a copy image.

Further, in the present embodiment, the color conversion LUT is embedded in a ridge line corresponding to yellow color, which makes it more difficult to realize a difference in change in RGB gradation values. Specifically, yellow color is less conspicuous in change in color, and even if there is some change in RGB gradation values, the color change is hardly noticeable. Due to the above reason, in the copy processing of the present embodiment, despite such change in RGB gradation values, it is possible to obtain a high-quality color image by reproducing an original manuscript image.

Still further, in the copy processing of the present embodiment, it is not necessary to execute complicated processing in which the color conversion LUT is changed during color conversion processing. Thus, the color conversion processing can be executed conveniently. Specifically, on executing the color conversion processing, as shown in FIG. 9, a reference is made to a color conversion LUT obtained by embedding the color conversion LUT for characters in the color conversion LUT for color images, but no reference is made to two color conversion LUTs, that is, the color conversion LUT for color images and the color conversion LUT for characters. Thus, it is not necessary to switch the color conversion LUT for color images to the color conversion LUT for characters or vice versa. Therefore, the color conversion processing is not complicated and can be executed conveniently. Further, due to the above-described fact, hardware is used to realize conveniently the color conversion processing. For example, a color conversion processing-specific LSI or others which output CMYK image data by obtaining RGB image data and the color conversion LUTs as input data can be produced relatively easily. Thus, the color conversion processing can be executed conveniently and quickly by using the specific LSI. Further, since a color conversion LUT in which the color conversion LUT for character is embedded is equal in data amount (the number of bytes) to a color conversion LUT for ordinary color images, it is also possible to use various types of hardware used in the color conversion LUT for ordinary color images, as they are, in the color conversion LUT in which the color conversion LUT for characters is embedded. As a matter of course, even where the above-described hardware is used, CMYK image data in which only K ink is used is obtained at apart of characters. It is, thereby, possible to print a high-quality copy image at the part of characters.

In addition, in the copy processing of the present embodiment, even where characters are incorrectly recognized on detection of them (refer to Step S102 in FIG. 2), there is no chance that a copy image will instantly develop into an unnatural image, thus, making it possible to output an appropriate copy image. Specifically, where characters are incorrectly recognized on detection of them and a part other than characters is recognized as characters, the thus incorrectly recognized part is converted by the color conversion LUT for characters to CMYK gradation values in which only K ink is used. However, since the color conversion LUT for characters has gradation values according to values of a gray scale (refer to FIG. 5B), an image of achromatic colors to be expressed by CMY is only replaced by an image of achromatic color expressed by K ink, which is not greatly different from a manuscript image. Therefore, for example, even if a part of a photo image is incorrectly recognized as characters, the thus incorrectly recognized part is not made unnatural in anyway but can be output as a natural photo image. In the copy processing of the present embodiment, it is possible to print a copy image appropriately even on incorrect recognition. Further, as apparent from the above description, there is no need for adopting a complicated and sophisticated method for detecting characters to avoid the incorrect recognition, thus making it possible to execute copy processing quickly. It is also possible to make the control unit 300 simple in constitution.

Figure 10A:
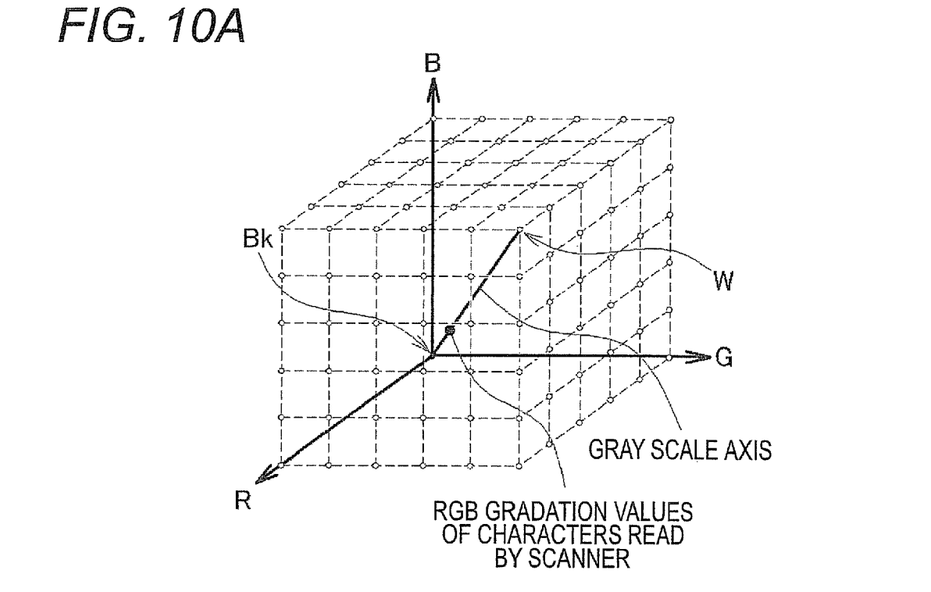
FIGS. 10A and 10B are drawings for explaining CMYK gradation values which are obtained where pixels constituting characters are subjected to color conversion processing by the color conversion LUT for color images.
Figure 10B:
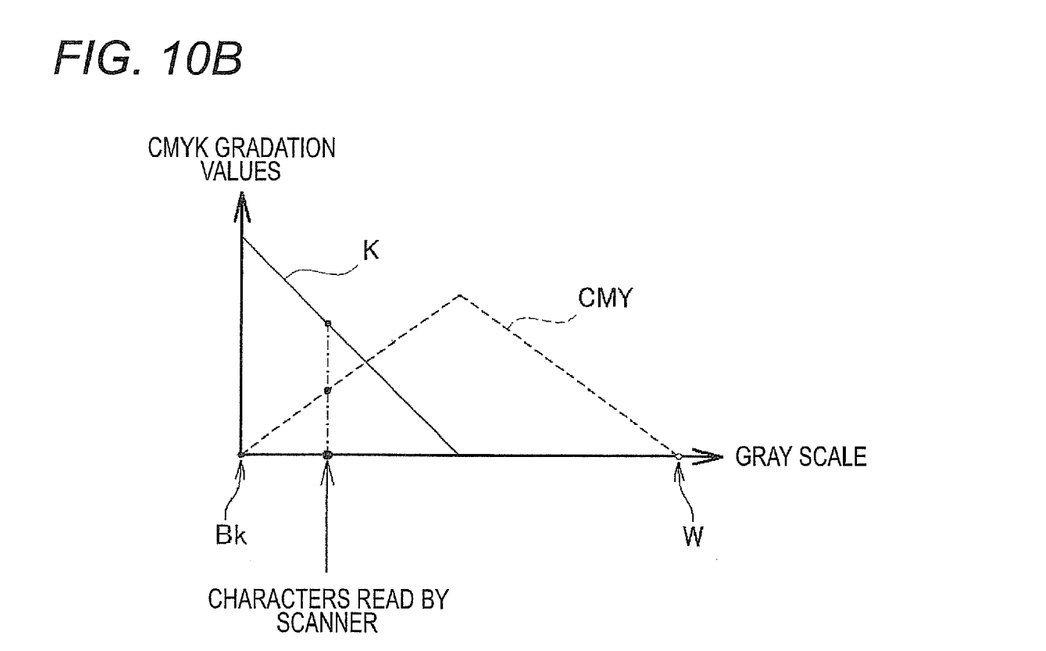

As reference, a brief description will be given for a quality of characters where ordinary color conversion processing is executed without using the copy processing of the present embodiment. FIGS. 10A and 10B show a way of converting RGB gradation values at a part of characters to CMYK gradation values where the color conversion LUT for ordinary color images is used to execute the color conversion processing. As described previously, in RGB image data loaded by the scanner unit 100, even black-color characters have a tinge of gray color. Specifically, there are obtained RGB gradation values at a position which has moved to "W" to some extent along the axis in the drawing (so-called gray scale axis) from an origin (corresponding to black color) indicated as "Bk" in FIG. 10A. FIG. 10B shows CMYK gradation values set on the gray scale axis. The color conversion LUT for ordinary color images is required to print a color image in a higher image quality. Therefore, CMYK gradation values in which CMY respective color inks more suitable in color image printing are set also on the gray scale axis. As a matter of course, it is possible to set to a perfect black color (indicated as "Bk" in the drawing) the CMYK gradation values in which only K ink is used. However, in order to express the change in gradation more smoothly at a part of a gray color, it is necessary to set the CMYK gradation values in which the CMY respective color inks are used. When these color conversion LUTs are used to execute color conversion processing, characters read by the scanner unit 100 have a tinge of gray color and are converted to the CMYK gradation values in which not only K ink but also the CMY respective color inks are used, as shown in FIG. 10B. As a result, inks are used in an increased amount to result in blurred outlines of characters, and the characters are seemingly faded. Due to the above reasons and others, quality of a copy image at a part of characters is reduced. However, in the printing apparatus of the present embodiment, only K ink can be used in printing, thus making it possible to print a high-quality copy image even at a part of characters.

A description has been given for the previously described embodiment in which two color conversion LUTs are synthesized to create a new color conversion LUT on execution of copy processing. However, in place of synthesizing two color conversion LUTs on execution of copy processing, the thus synthesized color conversion LUT may be previously stored on a ROM to read the color conversion LUT from the ROM on execution of copy processing. Thereby, there is eliminated a necessity for synthesizing the color conversion LUT every time the copy processing is executed, thus making it possible to execute the copy processing more quickly and output a favorable copy image.

On the other hand, if the LUT is synthesized on copy processing, the thus synthesized LUT is not required for storage. Therefore, it is possible to save a memory capacity.

In the previously described embodiment, a description has been given for a case where on embedding the color conversion LUT for characters, it is to be embedded on a ridge line corresponding to yellow color inside a RGB coordinate space (refer to FIGS. 6A and 6B). However, the color conversion LUT for characters may also be embedded on other ridge lines. Further, it may be embedded on a ridge line which is different in every image to be printed. For example, image data loaded by the scanner unit 100 is analyzed to examine the distribution of RGB gradation values which are used in the image data, by which the color conversion LUT for characters may be embedded in a part of a ridge line which is least used. Since pixels which change the RGB gradation values can be further decreased in number, it is possible to output a favorable copy image which reflects colors of a manuscript image more accurately. In addition, since the RGB gradation values are changed less frequently, it is possible to print a copy image more quickly.

A description has been given so far for the image processing device of the present embodiment. However, the present invention shall not be limited to any one of the above-described embodiments or exemplified variations and may be executed in various modifications within a scope not departing from the scope thereof.

What is claimed is:

1. A method for printing an image by using ink of at least one achromatic color and at least three chromatic colors based on RGB image data obtained from a printed image, the method comprising:
   setting a plurality of first lattice points in an RGB color solid defined by RGB components of the RGB image data;
   storing a first table indicating a relationship between a color defined by each of the first lattice points and amounts of the ink of the achromatic color and the ink of the chromatic colors;
   storing a second table indicating a relationship between one of a plurality of brightness values and an amount of the ink of achromatic color for representing the one of the brightness values;
   storing information indicating a relationship between the brightness values and some of the first lattice points located at a ridge area including a ridge line of the RGB color solid at which two of the RGB components take either maximum values or minimum values thereof;
   generating a third table in which the second table is embedded in the first table based on the information;
   extracting a character area in which a character is printed from the printed image;
   converting first RGB components of the image data corresponding to the extracted character area into the RGB components defined by the some of the lattice points based on brightness values of the RGB components of the image data, thereby generating modified image data;
   converting the RGB components of the modified image data into amounts of the ink of a chromatic color and the ink of chromatic colors based on the third table; and
   printing the image in accordance with the converted amounts of the ink of achromatic color and the ink of chromatic colors.

2. The method according to claim 1, wherein
   in a case where second RGB components of image data corresponding to an area other than the character area are located within the ridge area, the second RGB components are converted into third RGB components located outside of the ridge area.

3. The method according to claim 1, wherein
   the two of the RGB components are an R component and a G component.

4. A printing apparatus for printing an image by using ink of at least one achromatic color and at least three chromatic colors based on RGB image data obtained from a printed image, the printing apparatus comprising:
   a first storage, configured to set a plurality of first lattice points in an RGB color solid defined by RGB components of the RGB image data, and configured to store a first table indicating a relationship between a color defined by each of the first lattice points and amounts of the ink of the achromatic color and the ink of the chromatic colors;
   a second storage, configured to store a second table indicating a relationship between one of a plurality of brightness values and an amount of the ink of achromatic color for representing the one of the brightness values;
   a third storage, configured to store information indicating a relationship between the brightness values and some of the first lattice points located at a ridge area including a ridge line of the RGB color solid at which two of the RGB components take either maximum values or minimum values thereof;
   a generator, configured to generate a third table in which the second table is embedded in the first table based on the information;
   a extractor, configured to extract a character area in which a character is printed from the printed image;
   a first converter, configured to convert first RGB components of the image data corresponding to the extracted character area into the RGB components defined by the some of the lattice points based on brightness values of the RGB components of the image data, thereby generating modified image data,
   a second converter, configured to convert the RGB components of the modified image data into amounts of the ink of achromatic color and the ink of chromatic colors based on the third table; and
   a printer, configured to print the image in accordance with the converted amounts of the ink of achromatic color and the ink of chromatic colors.

5. The printing apparatus according to claim 4, further comprising
a third converter, configured to, in a case where second RGB components of image data corresponding to an area other than the character area are located within the ridge area, convert the second RGB components into third RGB components located outside of the ridge area.

6. The printing apparatus according to claim 4, wherein
the two of the RGB components are an R component and a G component.

7. A non-transitory computer-readable medium storing a program configured to cause a computer to execute the method as set forth in claim 1.

8. The computer-readable medium according to claim 7, wherein
in a case where second RGB components of image data corresponding to an area other than the character area are located within the ridge area, the second RGB components are converted into third RGB components located outside of the ridge area.

9. The computer-readable medium according to claim 7, wherein
the two of the RGB components are an R component and a G component.

* * * * *